United States Patent [19]

Peters

[11] Patent Number: 4,986,977
[45] Date of Patent: Jan. 22, 1991

[54] RECOVERY OF USEFUL PRODUCTS FROM BY-PRODUCTS OF PHOSPHATE CONVERSION COATING PROCESS

[75] Inventor: Donald S. Peters, Novelty, Ohio

[73] Assignee: Man-Gill Chemical Company, Cleveland, Ohio

[21] Appl. No.: 449,589

[22] Filed: Dec. 12, 1989

[51] Int. Cl.$^5$ ............................................. C23C 22/08
[52] U.S. Cl. .................................... 423/592; 75/419; 75/430; 75/431; 148/615; 148/253
[58] Field of Search ................... 75/97, 419, 430, 431; 423/201, 205, 592; 148/6.15

[56] References Cited

U.S. PATENT DOCUMENTS

| | | | |
|---|---|---|---|
| 2,859,145 | 11/1958 | Somers et al. | 148/6.15 |
| 3,090,709 | 5/1963 | Henricks | 148/6.15 |
| 3,104,177 | 9/1963 | Goldsmith | 117/71 |
| 3,307,979 | 3/1967 | Upham | 148/6.15 |
| 3,458,364 | 7/1969 | Upham | 148/6.15 |
| 3,653,875 | 4/1972 | Waters | 75/97 R |

*Primary Examiner*—Peter D. Rosenberg
*Attorney, Agent, or Firm*—Renner, Otto, Boisselle & Sklar

[57] ABSTRACT

The process is described for treating the sludge formed in a phosphate conversion bath, and in particular, in zinc phosphate conversion baths to convert the sludge into useful chemical materials thereby eliminating the need for disposal to landfill. The process comprises the steps of (A) recovering the solid by-products from the used phosphating solution;
(B) treating the solid by-products with an aqueous base at a pH of greater than 10 to form a first aqueous phase and a metal-containing precipitate;
(C) recovering the metal-containing precipitate from the first aqueous phase as a first product of the process;
(D) acidifying the first aqueous phase obtained in (C) to a from about 7 to about 10 to form a second aqueous phase and an insoluble metal-containing precipitate;
(E) recovering the solid metal-containing precipitate from the second aqueous phase as a second product of the process; and
(F) recovering the second aqueous phase as a third product of the invention.

22 Claims, 2 Drawing Sheets

RECOVERY OF USEFUL PRODUCTS FROM BY-PRODUCTS OF PHOSPHATE CONVERSION COATING PROCESS

FIELD OF THE INVENTION

This invention relates to the preparation of useful products from the solid by-products of phosphate conversion coating bath. More particularly, the invention relates to the recovery of valuable chemicals from the sludge by-products contained in aqueous metal phosphating solutions.

BACKGROUND OF THE INVENTION

It is well known in the metal-finishing art that metal surfaces such as ferrous and zinc surfaces may be provided with an inorganic phosphate coating by contacting said surfaces with an aqueous phosphating solution. The phosphate coating protects the metal surface to a limited extent against corrosion and serves primarily as an excellent base for the later application of siccative organic coating compositions such as paints, lacquers, varnish, primers, synthetic resins, enamels, rustproofing oil, etc.

The aqueous phosphating solutions utilized to deposit the desired phosphate coatings generally contain, in addition to phosphate ions, metallic ions such as zinc, lead, iron or manganese ions as the major cations. Other cations which may be present, generally in lower concentrations, include cobalt and nickel. Other auxiliary cations which may also be present in small amounts include sodium, cadmium, copper, and antimony ions. Anions which may be present in small amounts include halide ions such as bromide and fluoride ions, sulfate ions and borate ions. These auxiliary ions may be included in the phosphating solutions to influence the reaction with the metal surface, modify the character of the phosphate coating, modify the character of the sludge formed during the phosphating process and adapt the phosphating solution for a wide variety of applications. Other auxiliary agents which may be present include oxidizing agents, coloring agents, and metal cleaning agents.

The metal surfaces which may be treated with the phosphating solutions to provide protection against corrosion and a base for later application of top coats include nuts, bolts, screws, hood hinges and a variety of other parts. The desired coating is obtained generally by immersion of the parts in a hot solution of the phosphating solution. The first step in the phosphating of steel is the dissolving of the surface iron. The dissolved iron along with other ions present in the bath and formed during the phosphating process are converted to a sludge which is insoluble in the phosphating bath and settles to the bottom of the solution. The sludge must be periodically removed from the phosphating solution and transported, generally at significant cost for disposal at a landfill. It has become increasingly difficult and costly to dispose of the sludge.

SUMMARY OF THE INVENTION

A process is described for treating the sludge formed in a phosphate conversion bath, and in particular, zinc phosphate conversion baths, to convert the sludge into useful chemical materials thereby eliminating the need for disposal to landfill. The process for recovering the solid by-product sludge contained in aqueous metal phosphating solutions used to plate zinc or ferrous surfaces comprises the steps of (A) recovering the solid by-products from the used phosphating solution;

(B) treating the solid by-products with an aqueous base at a pH of greater than 10 to form a first aqueous phase and a metal-containing precipitate;

(C) recovering the metal-containing precipitate from the first aqueous phase as a first product of the process;

(D) acidifying the first aqueous phase obtained in (C) to a pH of about 7 to about 10 to form a second aqueous phase and an insoluble metal-containing precipitate;

(E) recovering the solid metal-containing precipitate from the second aqueous phase as a second product of the process; and (F) recovering the second aqueous phase as a third product of the process.

THE DRAWINGS

In the annexed drawing.

DESCRIPTION OF THE PREFERRED EMBODIMENTS

Throughout this specification and claims, all parts and percentages are by weight, temperatures are in degrees Celsius, and pressures are at or near atmospheric pressure unless otherwise clearly indicated.

The present invention provides a process for recovering sludge from aqueous metal phosphating solutions used to coat zinc or ferrous surfaces and for converting the recovered sludge to useful materials. The preparation and use of aqueous metal phosphating solutions is well known in the metal finishing art as shown by U.S. Pat. Nos. 2,859,145; 3,090,709; 3,104,177; 3,307,979; 3,458,364, etc. The use of zinc, lead, iron and manganese phosphate solutions to deposit phosphate coatings on metal surfaces generally is preferred. The process of the present invention is particularly applicable to the recovery of sludge from zinc-phosphate coating solutions used on zinc or ferrous surfaces.

Aqueous phosphating solutions generally are prepared by dissolving in water, minor amounts of phosphoric acid, and, optionally, one or more metal salts such as the nitrate, phosphate, nitrite, sulfate, chlorate, or bromide of sodium, zinc, iron, lead, cadmium and cobalt. Generally, an oxidizing agent such as sodium chloride, potassium perborate, sodium nitrate, sodium nitrite or hydrogen peroxide is included in the phosphating solution to depolarize the metal surface being treated and thereby increasing the rate at which the phosphate coating is formed on the metal surface.

One common type of commercial phosphating bath which contains zinc ion, phosphate ion and a depolarizer is made by dissolving small amounts of zinc dihydrogen phosphate, sodium nitrate and phosphoric acid in water. U.S. Pat. No. 3,090,709 describes another type of zinc phosphate solution which is useful for depositing a dense, adherent, micro-crystalline or amorphous zinc phosphate coating on metal parts. The phosphate coating solutions described in the '709 patent contain as essential ingredients, zinc ion, phosphate ion, nitrate ion, and an ion selected from the group consisting of lithium, beryllium, magnesium, calcium, strontium, cadmium and barium ions.

The sludge which is formed and which precipitates from a zinc phosphating solution as the solution is used to phosphate zinc or ferrous surfaces contains insoluble compounds of iron and zinc. Sludge from phosphating solutions for spray applications generally will comprise about 1.7% zinc, about 6.5 to 7.0% iron and about 25% phosphate. Sludge formed in phosphating solutions used in heavier duty dipping applications generally contain about 6.5 to 7.0% zinc, about 7.0 to 7.5% iron and about 25% phosphate. The iron is present in the sludge generally as ferric phosphate ($FePO_4$) and the zinc is present as zinc phosphophyllite ($Zn_3(PO_4)_2$).

Figure 1:
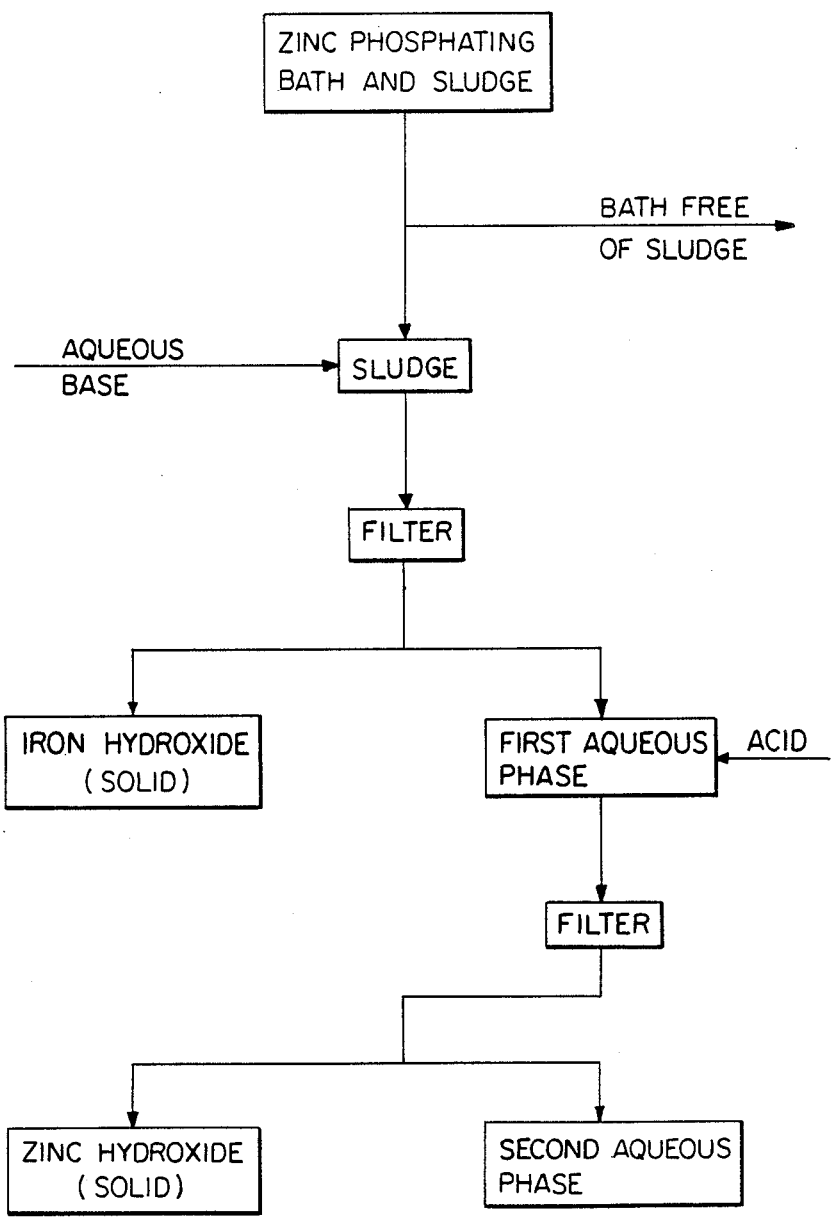
FIG. 1 is a generalized flow diagram of one embodiment of the invention.

One embodiment of the process of the invention is generally described in FIG. 1 with reference to a zinc phosphating bath containing sludge after use of the zinc phosphating bath on a zinc or ferrous surface. The sludge can be recovered from the used phosphating solutions by any technique well known in the art such as by utilizing filters, baffles, sludge towers, centrifuges, vacuums (swimming pool type), shovels, buckets, etc. The particular technique for removing the sludge from the phosphating tanks is not critical to the present invention.

The sludge which is removed and isolated from the phosphating solution is treated with an aqueous base at a pH above 10 and generally between about 12–14 which initially dissolves the sludge and then forms a first aqueous phase and a metal-containing precipitate. The aqueous base used to treat the sludge may be aqueous solutions of alkali metal hydroxides, ammonium hydroxide or various amines including alkanolamines. Particularly useful and inexpensive aqueous bases for treating the sludge in step (B) are aqueous solutions of sodium hydroxide or potassium hydroxide. The amount of aqueous base may be varied over a wide range although the use of excessive amount of base adds to the cost of the process without significant improvement in result. Generally weight ratios of alkali to sludge of from about 2:1 to 1:3 provide satisfactory results. The amount of base used in this step of the process is an amount sufficient to provide the desired reaction and precipitate of iron hydroxide and to maintain the zinc in solution.

The metal-containing precipitate generally is a metal hydroxide, and in particular, iron hydroxide. The chemical reactions which can occur in this step include the following:

$$3KOH + FePO_4 = Fe(OH)_3 + K_3PO_4$$

$$KOH + Zn_3(PO_4)_2 = Zn(OH)_2 + K_3PO_4$$

$$KOH + Zn(OH_2) = K_2Zn(OH)_4$$

The metal-containing precipitate, generally iron hydroxide, is then separated and recovered from the first aqueous phase as a first product of the process. The separation may be accomplished by any of the known techniques such as filtering, centrifuging, settling, etc. Prior to recovering the precipitate from the first aqueous phase, the mixture may be diluted with water to reduce the tendency to gel and facilitate filtration.

The first aqueous phase, after separation of the precipitate, is acidified (step (D)) to lower the pH to a level of from about 7 to about 10 and more often from about 7.5 to about 9.5 to form a second aqueous phase and another insoluble metal-containing precipitate, i.e., zinc hydroxide. The first aqueous phase can be acidified with a mineral acid or an organic acid, and sufficient acid generally will be utilized to adjust the pH to between 7.5 and 9.5. Mineral acids such as hydrochloric acid, nitric acid, phosphoric acid, etc., are preferred. Phosphoric acid is a particularly preferred acid for acidifying the first aqueous phase in the embodiment illustrated in FIG. 1. Organic acids also may be used and these include, for example, acetic acid, propionic acid, etc. The reactions which occur in this step upon addition of the acid and reduction in pH are as follows:

$$3K_2Zn(OH)_4 + 2H_3PO_4 = 3Zn(OH)_2 + ZK_3PO_4 + 6H_2O$$

$$2K_3PO_4 + H_3PO_4 = 3K_2HPO_4$$

The precipitate formed on acidification of the first aqueous phase in step (D) is recovered from the second aqueous phase such as by filtering, settling, centrifuging, etc. The precipitate and filtrate are recovered as products of the process of the invention. The filtrate (second aqueous phase) contains soluble phosphates, particularly alkali metal phosphates when the base added to the sludge is an aqueous solution of an alkali metal base compound. When the base is potassium hydroxide, the second aqueous phase contains dipotassium phosphate ($K_2HPO_4$).

The nature of the products recovered from the process of the invention may be illustrated with respect to the products recovered from a zinc phosphating bath which has been utilized to treat a ferrous surface. In such instances, the sludge removed from the used phosphating solution will comprise iron as ferric phosphate and zinc as zinc phosphophyllite. Upon treatment with an aqueous base such as sodium or potassium hydroxide in step (B) of the present invention, a precipitate of iron hydroxide is formed and recovered from the first aqueous phase in step (C). Upon acidification of the first aqueous phase in step (D), a second insoluble metal-containing precipitate forms, and this precipitate is zinc hydroxide. The second aqueous phase recovered in step (F) contains liquid potassium (or sodium) phosphate.

Figure 2:
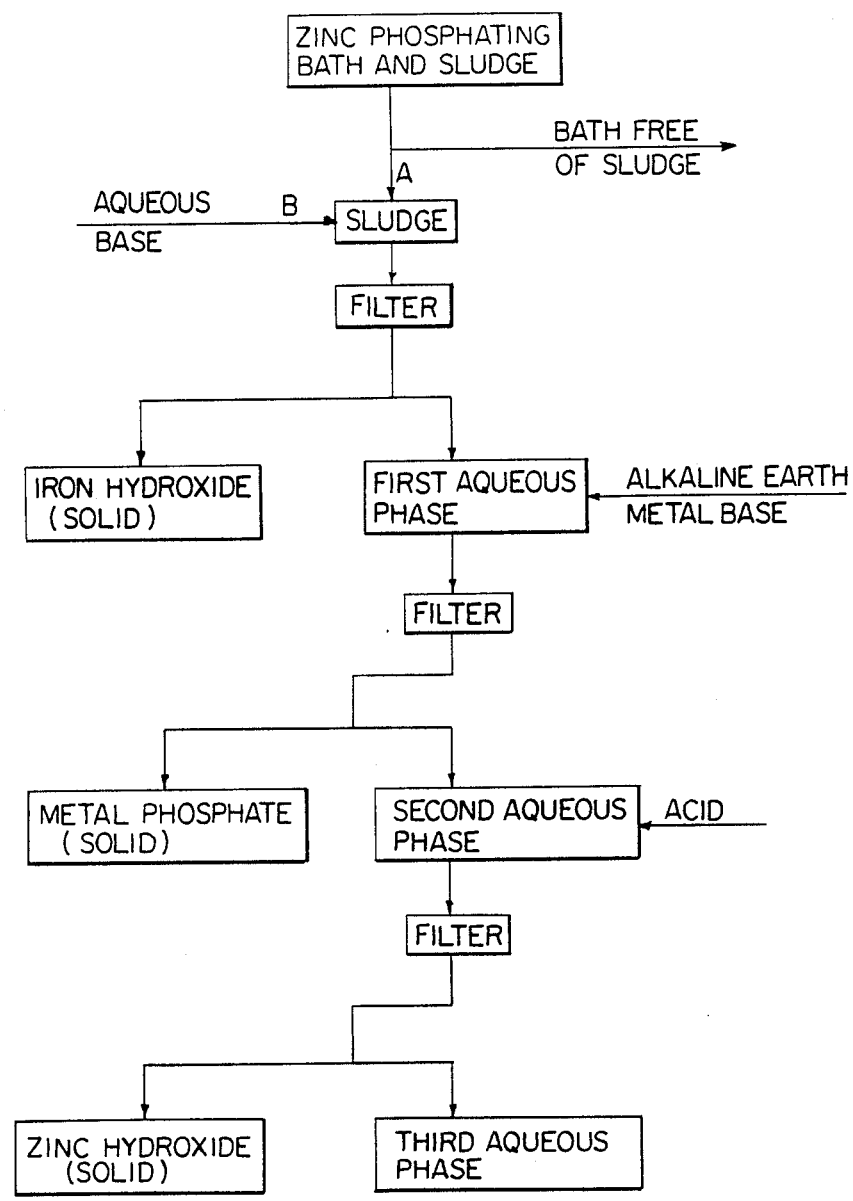
FIG. 2 is a generalized flow diagram of one preferred embodiment of the invention.

In another embodiment illustrated in FIG. 2, the process of the present invention comprises the steps of (A) recovering the solid by-products from the used phosphating solution;

(B) treating the solid by-products with an aqueous base to a pH of greater than 10 (preferably 11-14) to form a first aqueous phase and a metal-containing precipitate;

(C) recovering the metal-containing precipitate from the first aqueous phase as a first product of the process;

(D) treating the first aqueous phase obtained in step (C) with an alkaline earth metal base to a pH of greater than 10 (preferably 11-14) to form a second aqueous phase and an insoluble alkaline earth metal-containing phosphate precipitate;

(E) recovering the insoluble metal phosphate from the second aqueous phase as a second product of the process;

(F) acidifying the second aqueous phase obtained in step (E) to a pH of from about 7 to about 10 to form a third aqueous phase and an insoluble metal-containing hydroxide precipitate;

(G) recovering the solid metal-containing precipitate from the third aqueous phase as a third product of the process; and (H) recovering the third aqueous phase as a fourth product of the process.

The above process which is illustrated in FIG. 2 represents a presently preferred process of the present invention. This preferred process differs from the process illustrated in FIG. 1 in that the first aqueous phase, after separation of the insoluble hydroxide, is treated with an alkaline earth metal base which results in the formation and precipitation of an alkaline earth metal phosphate thereby resulting in a separation and isolation of the phosphate contained in the original sludge. The separation and recovery of the phosphate from the sludge at this stage is presently preferred since it appears that the subsequent precipitation of the zinc hydroxide from the aqueous phase is facilitated. Additionally, the prior removal of the metal phosphate from the aqueous phases results in a final aqueous phase which contains soluble alkali metal salts essentially free of phosphate ions.

The products of the process of the present invention conducted on the sludge from a zinc phosphating bath are useful raw materials with a variety of applications. For example, the iron hydroxide may be dissolved in mineral acids for water treatment, aluminum desmutting or other industrial uses. The zinc hydroxide may be dissolved in phosphoric acid to prepare zinc phosphate concentrate which can then be utilized in another zinc phosphating solution. The liquid potassium phosphate recovered from the process of the present invention illustrated in FIG. 1 may be used to manufacture iron phosphate concentrates or may be used in the preparation of alkaline cleaners. The insoluble phosphate recovered from the second aqueous phase in the preferred process illustrated in FIG. 2 is also useful. Although any insoluble alkaline earth metal phosphate can be formed in the process, calcium phosphate (precipitated by the addition of, e.g., $CaCO_3$) is a preferred precipitate since the calcium phosphate can be used directly in the preparation or enrichment of calcium phosphating solutions. Accordingly, as illustrated in the above examples and in FIGS. 1 and 2, the process of the present invention converts sludge by-products having no utility into valuable and useful chemicals thereby essentially eliminating the problem of disposing sludge.

Specific examples of the utility of the products obtained by the process of the invention as raw materials in various applications are as follows:

EXAMPLE A

Zinc Phosphate Solution Using Recovered Zinc Hydroxide

|  | Wt. % |
| --- | --- |
| Water | 20–30 |
| Phosphoric acid | 30–50 |
| Nitric acid | 5–20 |
| Nickel nitrate | 5–15 |
| Zinc hydroxide | 8–15 |
| Hydrofluoric acid | 2–5 |

EXAMPLE B

Zinc Phosphate Solution Using Recovered Zinc Hydroxide and Calcium Phosphate

|  | Wt. % |
| --- | --- |
| Water | 20–30 |
| Phosphoric acid | 30–50 |
| Nitric acid | 5–20 |
| Nickel nitrate | 5–15 |
| Zinc hydroxide | 8–15 |
| Hydrofluoric acid | 2–5 |
| Recovered calcium phosphate | 10–20 |

EXAMPLE C

Water Treating Product Using Recovered Ferric Hydroxide

|  | Wt. % |
| --- | --- |
| Water | 40–60 |
| Sulfuric acid | 25–40 |
| Ferric hydroxide | 10–25 |

EXAMPLE D

Iron Phosphate Using Recovered Phosphate Solution

|  | Wt. % |
| --- | --- |
| Water | 30–35 |
| Phosphate solution | 20–30 |
| Caustic soda | 5–10 |
| Phosphoric acid | 20–30 |
| Sodium chlorate | 15–25 |

EXAMPLE E

Alkaline Cleaner Using Recovered Phosphate Solution

|  | Wt. % |
| --- | --- |
| Water | 40–60 |
| Phosphate solution | 15–25 |
| Sodium silicate | 5–20 |
| E.D.T.A. | 2–10 |
| Anionic surfactants | 1–5 |
| Nonionic surfactants | 1–5 |
| Sodium hydroxide | 5–20 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for recovering solid by-products contained in an aqueous metal phosphating solution used to phosphate coat a zinc or ferrous surface, and converting said by-products to useful materials which comprises the steps of:
   (A) recovering the solid by-products from the used phosphating solution;
   (B) treating the solid by-products with an aqueous base to a pH of about 10 to form a first aqueous phase and a metal- containing precipitate;
   (C) recovering the metal-containing precipitate from the first aqueous phase;
   (D) acidifying the first aqueous phase obtained in (C) to a pH of from about 7 to about 10 to form a second aqueous phase and an insoluble metal-containing precipitate;
   (E) recovering the solid metal-containing precipitate from the second aqueous phase; and
   (F) recovering the second aqueous phase.

2. The process of claim 1 wherein the aqueous metal phosphating solution is an aqueous zinc phosphating solution, and the metal-containing precipitate obtained in step (E) contains zinc.

3. The process of claim 1 wherein the pH in step (B) is maintained at about 11 to 14.

4. The process of claim 1 wherein the solid metal-containing precipitate covered in step (B) contains iron.

5. The process of claim 1 wherein the first aqueous phase obtained in step (C) is acidified in step (D) to a pH of from about 7.5 to about 9.5.

6. The process of claim 1 wherein the first aqueous phase is acidified in step (D) with a mineral or organic acid.

7. The process of claim 1 wherein the first aqueous phase is acidified in step (D) with a mineral acid.

8. The process of claim 1 wherein the aqueous base utilized in step (B) is an alkali metal hydroxide, ammonium hydroxide or an alkanolamine.

9. The process of claim 1 wherein the aqueous base used in step (B) is an aqueous solution of sodium hydroxide or potassium hydroxide.

10. The process of claim 1 wherein the precipitates are recovered in steps (C) and (E) by filtering, settling or centrifuging.

11. A process for recovering solid by-products contained in an aqueous acidic zinc phosphating solution which has been used to coat a zinc or ferrous surface, and converting said by-products to useful materials which comprises the steps of:
(A) recovering the solid by-products from the used zinc phosphating solution;
(B) treating the solid by-products with an aqueous solution of an alkali metal hydroxide to a pH of about 11 to 14 to form an iron-containing precipitate and a first aqueous phase;
(C) recovering the iron-containing precipitate from the first aqueous phase as a first product of the process;
(D) treating the first aqueous phase obtained in step (C) with an aqueous solution of a water-soluble alkaline earth metal compound to a pH in the range of about 11 to 14 to form an alkaline earth metal phosphate precipitate and a second aqueous phase;
(E) recovering the metal phosphate precipitate from the second aqueous phase, as a second product of the process;
(F) acidifying the second aqueous phase obtained in step (E) to a pH of about 7.5 to about 9.5 thereby forming a third aqueous phase and a solid zinc-containing precipitate;
(G) recovering the solid zinc-containing precipitate from the third aqueous phase as a third product of the process; and
(H) recovering the third aqueous phase as the fourth product of the process.

12. The process of claim 11 wherein the iron-containing precipitate recovered in step (C) comprises iron hydroxide.

13. The process of claim 11 wherein the alkaline earth in the alkaline earth metal compound present in the aqueous solution used in step (D) is a calcium compound.

14. The process of claim 13 wherein the calcium compound is a calcium carbonate.

15. The process of claim 11 wherein the metal phosphate recovered in step (E) is a calcium phosphate.

16. The process of claim 11 wherein the zinc-containing precipitate recovered in step (G) comprises zinc hydroxide.

17. The process of claim 11 wherein the second aqueous phase is acidified in step (F) with a mineral acid.

18. The process of claim 11 wherein the second aqueous phase obtained in step (E) is diluted with water prior to acidification in step (F).

19. The process of claim 11 wherein the second aqueous phase is acidified in step (F) with nitric acid.

20. The process of claim 15 wherein the precipitate comprising zinc hydroxide recovered in step (G) is dissolved in phosphoric acid to form a zinc phosphate concentrate.

21. The process of claim 19 wherein the third aqueous phase recovered in step (F) comprises a solution of an alkali metal nitrate.

22. A process for recovering solid by-products contained in an aqueous zinc phosphate plating bath used to plate a zinc or ferrous surface and converting said recovered by-products to useful materials which comprises the steps of:
(A) recovering the solid by-products from the used zinc phosphate plating bath;
(B) treating the solid by-products with an aqueous solution of sodium or potassium hydroxide at a pH in the range of about 11-14 to form a first aqueous phase and a precipitate comprising iron hydroxide;
(C) recovering the iron hydroxide precipitate from the first aqueous phase as a first product of the process;
(D) treating the first aqueous phase with a water-soluble calcium salt at a pH in the range of about 11-14 to form a second aqueous phase and a precipitate comprising calcium phosphate;
(E) recovering the calcium phosphate from the second aqueous phase as a second product of the process;
(F) acidifying the first aqueous phase with nitric or hydrochloric acid to a pH of from about 7.5 to about 9.5 thereby forming a third aqueous phase and a precipitate comprising zinc hydroxide;
(G) recovering the precipitate comprising zinc hydroxide from the third aqueous phase as a third product of the process; and
(H) recovering the third aqueous phase containing soluble nitrate or chloride materials as a fourth product of the process.

* * * * *